T. S. ALLEN.
DYNAMO ELECTRIC MACHINE.
APPLICATION FILED JULY 14, 1909.
1,210,750.
Patented Jan. 2, 1917.
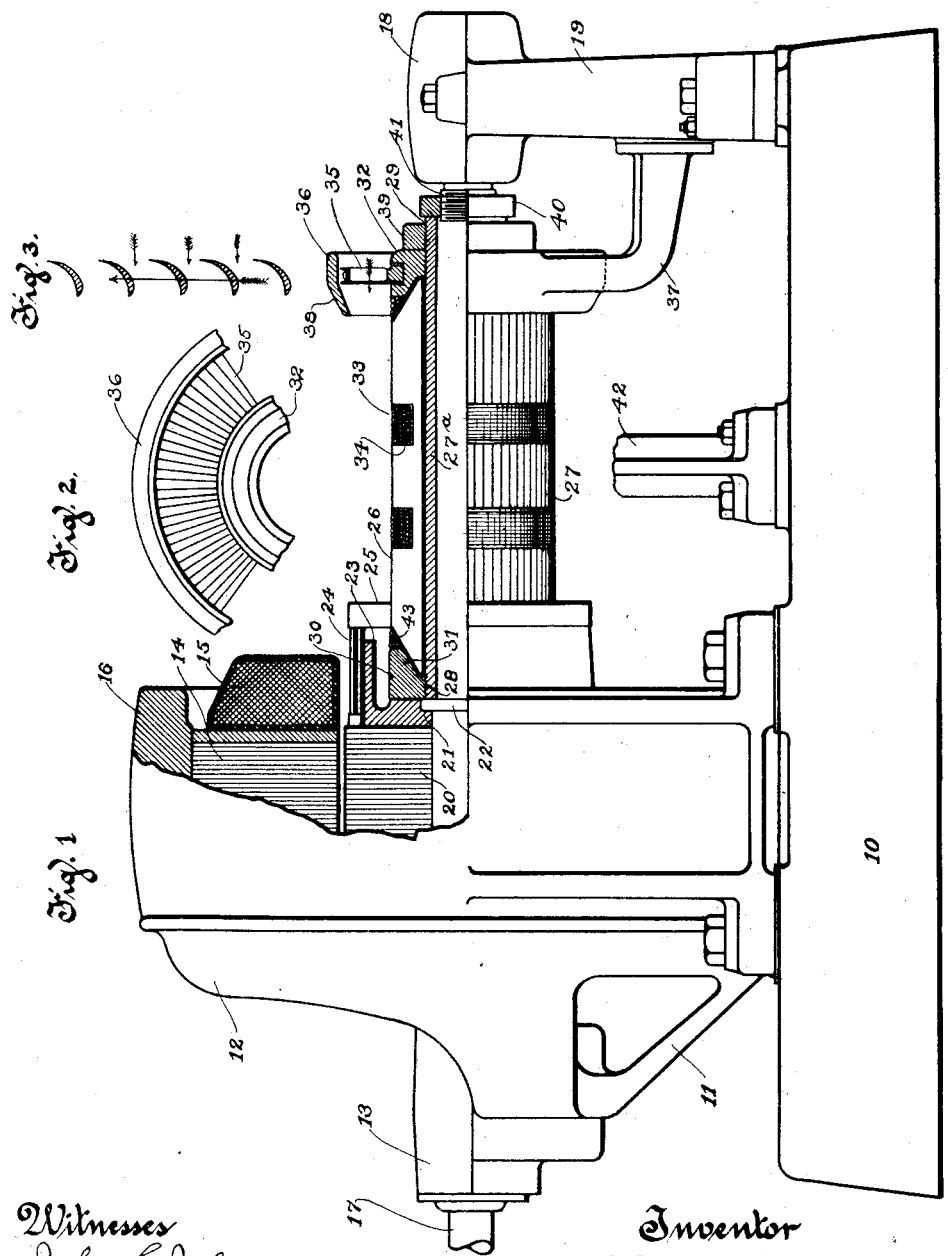
Witnesses
John L. Johnson
Chas. L. Byron
Inventor
Thomas S. Allen
By Chas. E. Lord
Attorney

UNITED STATES PATENT OFFICE.

THOMAS S. ALLEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,210,750.            Specification of Letters Patent.          Patented Jan. 2, 1917.

Application filed July 14, 1909. Serial No. 507,654.

*To all whom it may concern:*

Be it known that I, THOMAS S. ALLEN, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines and more specifically to the construction of the rotating members of such machines.

The main object of my invention is the provision of means whereby currents of air are created to prevent excessive heating of the several parts of a dynamo-electric machine, particularly a dynamo-electric machine of the commutator type.

My invention consists in certain novel details of construction and arrangement of parts which will be described in the specification and set forth in the appended claim.

Referring to the accompanying drawings, Figure 1 is a partial sectional view of a dynamo-electric machine embodying my invention; Fig. 2 is a side view of the fan blading arrangement; and Fig. 3 is a development of a portion of the fan blading.

In Fig. 1 of the drawings, 10 represents a base upon which is mounted the housing 11 of a dynamo-electric machine. Formed integrally with the end cover 12 of said housing is a bearing 13. Inwardly projecting poles 14 provided with coils 15 are mounted on the yoke 16 of the housing. A shaft 17 is mounted in the bearing 13 and another bearing 18 which is integral with a pedestal 19 secured to the base 10. A core 20, preferably laminated and provided with slots, is mounted on the shaft 17. At the ends of the core are provided end heads 21, one of which abuts one side of a flange 22 on the shaft 17. These end heads are provided with projections 23 to support the projecting ends of conductors 24, which are carried by the core 20. The conductors 24 are connected, by means of commutator leads 25, to bars 26 of the commutator 27. Mounted upon the shaft 17 on the other side of the flange 22 is a metal sleeve 27$^a$, which is provided with threaded portions 28 and 29. An annular member 30 engages the threaded portion 28 of the sleeve 27$^a$ and is forced firmly against the flange 22. This ring has a projecting portion 31 under which one end of the commutator bars 26 are retained. Suitable insulation is interposed between the annular member 30 and the commutator bars 26 and also between the sleeve 27$^a$ and the commutator bars. Another annular member or ring 32 at the opposite end of the commutator retains the commutator bars and is insulated therefrom.

The commutator is provided with slots or grooves 33 and is mounted on the sleeve 27$^a$. These annular grooves are lined with thin sheets of copper which are separated from the commutator bars by mica and upon which a wire band 34 is wound. Insulating material is placed over the wire bands and a layer or two of cording is wrapped around said insulating material to hold the latter in place. By means of this arrangement creeping between the commutator bars and wire bands is prevented. By means of the reinforcing bands located in the annular grooves it is impossible for the commutator bars to be displaced. Cord 43 is also wrapped around the ends of the commutator to keep the underlying insulation from flying out. Other suitable means for preventing displacement of the commutator bars may be used and applicant does not wish to be limited to the above construction.

The annular member 32 is provided with fan blading 35, the roots of the blades being dovetailed in said member and the upper portions of said blades being riveted to a shroud ring. These blades extend radially outward and are equally spaced and circumferentially located about the annular member 32. When the machine is in operation the blades, which are properly spaced and shaped, act in such a manner as to create currents of air which shoot longitudinally of the commutator and into the internal structure of the machine to produce most effective results in maintaining the various parts in a cool condition. As the commutator has no projections, the wire bands being located in the grooves thereof, the currents of air are not prevented from taking a direct path across the outside surface of the commutator. A housing 36 extends around the blading and is supported by a bracket 37, which is secured to the pedestal 19. One side of the housing is tapered inwardly as shown at 38, forming a nozzle to direct the fluid currents and increase the effects thereof. The ring 32, which is mounted upon the sleeve 27ª is forced inwardly and tightly held by the nut 39, which engages a threaded portion 29 of said sleeve. Movement of the sleeve is prevented by another nut 40, which engages a threaded portion 41 of the shaft 17. Another pedestal 42 secured to the base 10 is provided to support the brush rigging (not shown) of the machine.

The arrangement of the fan blading and commutator retaining means are particularly applicable to high speed machines having long commutators, but I do not intend to limit myself to this type. There may be many modifications of the precise arrangement here shown and described and I aim in my claim to cover the invention broadly.

What I claim as new is:—

In a dynamo-electric machine, a commutator comprising a support, a plurality of segments thereon, a member for retaining said segments in place on said support, fan means mounted on said retaining member, and a guide for said fan means held in position externally thereof by attachment to a fixed portion of said machine and effective to guide air discharged from said fan means along the commutator surface during the operation of said machine.

In testimony whereof I affix my signature, in the presence of two witnesses.

Milwaukee, Wis., July 10, 1909.

THOMAS S. ALLEN.

Witnesses:
CHAS. L. BYRON,
ROB. E. HOLL.

Copies of this patent may be obtained for five cents each, by addressing the "Commissioner of Patents, Washington, D. C."